(No Model.)  3 Sheets—Sheet 1.

G. G. GEIGER.
SHOVELING BOARD.

No. 423,425.  Patented Mar. 18, 1890.

Witnesses
C. A. Tefft
Roy Guild

Inventor
George G. Geiger
by W. V. Tefft
Atty.

(No Model.) 3 Sheets—Sheet 2.

G. G. GEIGER.
SHOVELING BOARD.

No. 423,425. Patented Mar. 18, 1890.

Witnesses.
C. A. Tifft
Roy Guild

Inventor
George G. Geiger
by W. V. Tifft
Atty.

(No Model.) 3 Sheets—Sheet 3.

G. G. GEIGER.
SHOVELING BOARD.

No. 423,425. Patented Mar. 18, 1890.

Witnesses—
C. A. Tefft
Roy Guild

Inventor.
George G. Geiger
by W. V. Tefft
atty.

UNITED STATES PATENT OFFICE.

GEORGE G. GEIGER, OF PEORIA, ILLINOIS.

SHOVELING-BOARD.

SPECIFICATION forming part of Letters Patent No. 423,425, dated March 18, 1890.

Application filed December 2, 1889. Serial No. 332,181. (No model.)

*To all whom it may concern:*

Be it known that I, GEORGE G. GEIGER, a citizen of the United States, residing at Peoria, in the county of Peoria and State of Illinois, have invented certain new and useful Improvements in Shoveling-Boards; and I do hereby declare that the following is a full, clear, and exact description of the invention, which will enable others skilled in the art to which it appertains to make and use the same.

My invention relates to certain new and useful improvements in shoveling-boards, whereby a board is provided which is very simple in construction, durable, and practical in its operation; and more particularly my improvement relates to a class of scoop-boards that may be used either on the outside or the inside of a wagon, whichever may be desired.

That my improvement may be the more readily understood, reference is had to the accompanying drawings, in which—

Figure 1:
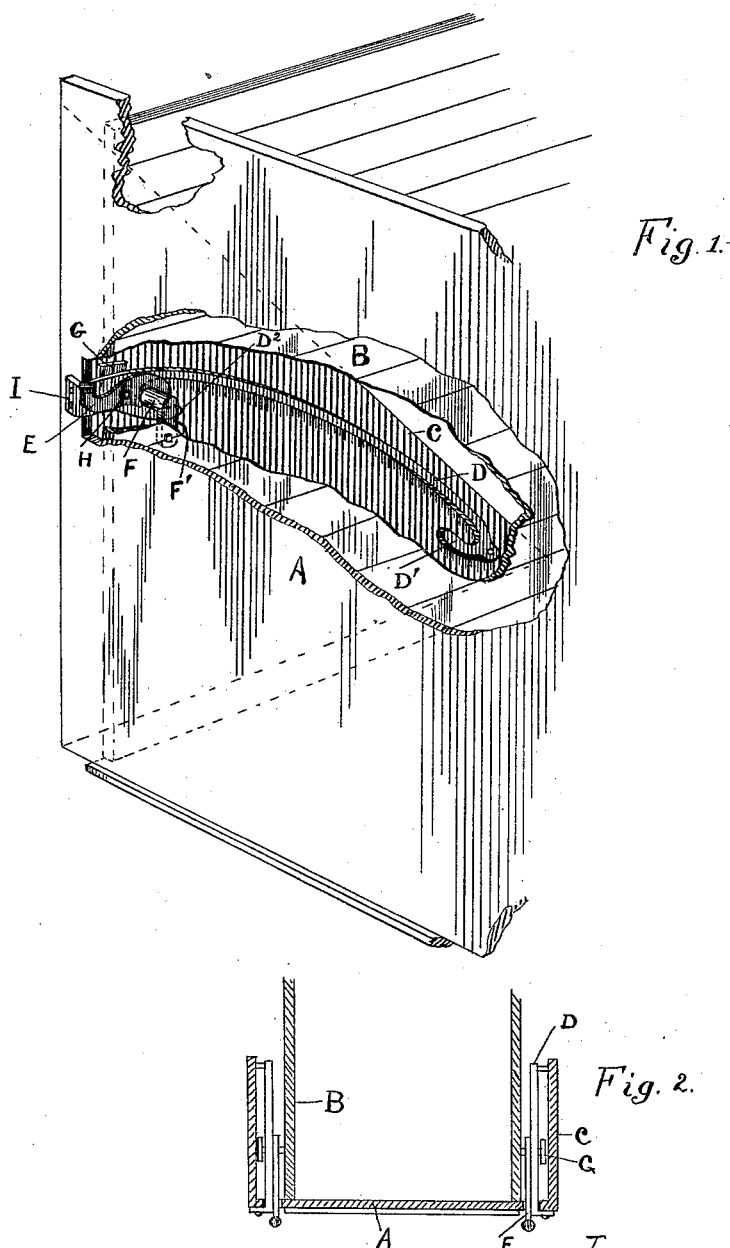
Figure 2:
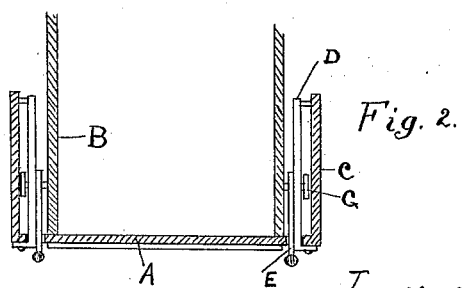
Figure 3:
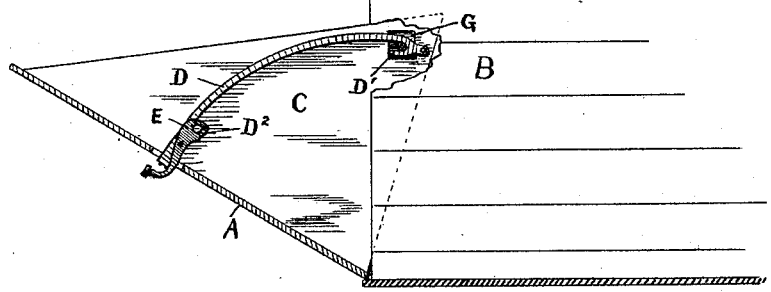
Figure 4:
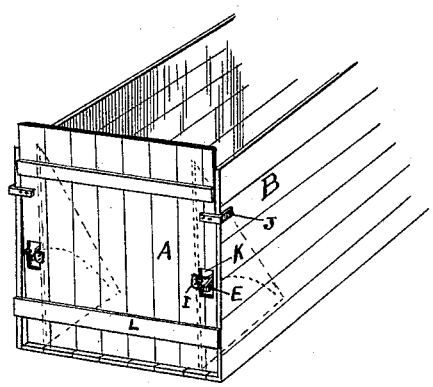
Figure 5:
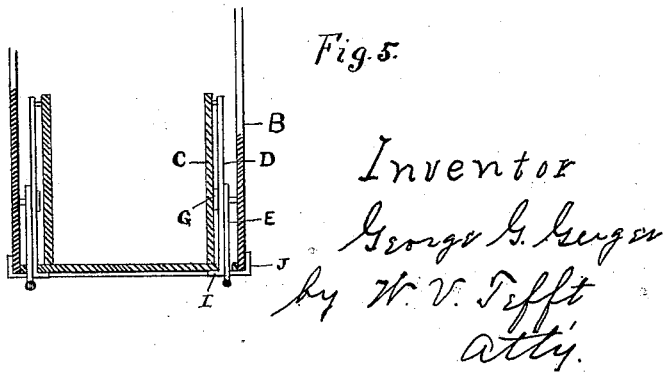

Figure 1 shows a perspective view of a cut section of a wagon-bed, with my improvement when used as an outside board. Fig. 2 shows my improvement applied to an outside board, as viewed from the top of a wagon-bed. Fig. 3 is a side view showing my improvement as attached to an inside board in a lowered position. Fig. 4 shows the inside board in a raised position. Fig. 5 shows my improvement applied to an inside board as viewed from the top of the wagon-box.

More particularly described, in Fig. 1, B is the wagon-bed, C is the cheek-board of a shoveling-board, and A the bottom of the shoveling-board. D is a curved iron bar bent downward and forward at each end to form the loops or pockets D′ D², or it may be called a "curved broken link." I is an extension of the curved bar D which is carried through the opening $x$ in the bottom of the shoveling-board and lapped over on the outside and firmly secured. F is a bolt having the T-head G and the extension F′. E is a dog or catch-lever pivoted at H.

In operation, when it is desired to be used as an outside board it must be wide enough to carry the cheek-boards about one and one-half inch from the sides of the wagon-box. My improvement is first attached to the cheek-boards, as shown, with the upper part of the curved bar one-half inch farther removed from the lower left-hand corner of the board than the lower part of the bar. The curved bar being thus firmly secured to the cheek-board it is carried by means of the T-headed lap-bolt F, which is firmly secured to the sides of the wagon-box, as shown in Fig. 1.

When the board is in an upright position, as shown in Fig. 1, the curved bar D is carried on the bolt F in the loop D², and is so carried that the T-head of the bolt F laps over and provides an outward bearing for the curved bar and thus preventing the cheek-boards from spreading. The dog E fits perfectly over the neck of the bolt F and firmly secures the board in an upright position, the bearing of the shoveling-board being entirely upon the bolt F, and the lower edge of the bottom C is carried one-half inch above the lower edge of the bottom of the wagon-bed. When it is desired to lower the board, by slightly pressing in upon the board and pressing downward upon the tails of the dogs E, that project through the openings $x$, it is easily detached and readily falls to the position shown in Fig. 3; and during the passage downward, until it is received in the loop D′, the constant forward bearing of the bolt F upon the curved bar provides a fulcrum below the central point, giving the upper part of the board a downward tendency and the lower part an upward, thus preventing its being thrown back as a body and losing the load; and the one-half inch difference in the forward attachment of the curved bar D raises the bottom of the board slightly above the bottom of the wagon-box. After unloading, by simply raising the board to an upright position it is readily caught and held in that position by means of the dogs E, making an automatic lock.

When desired to be used as an inside board, it is effected by merely changing to the proper width and changing the cheek-boards to opposite sides and carrying the board forward until it has a bearing upon the bottom of the bed; otherwise, it is the same, and its operation identical with that of the outside board. When the inside board is in the raised position, it completely closes the end of the wagon, so as to prevent anything with which the wagon may be loaded from losing out; and the cheek-boards of the inside board are set in a sufficient distance to allow the attachment of the curved bar and the other attachments necessary in its operation. The lower brace of the inside board is allowed to project out on either side, so as to prevent the board from falling forward by forming a bearing against the edges of the wagon-box. The inside board is also provided with the straps J to prevent the bed from spreading.

It will readily be seen that the inside or outside board is easily detached and removed from the wagon, which is accomplished by merely raising it off from the bolt D, and if desired it can be used as a seat-board.

The particular advantage possessed by my improvement in shoveling-boards is that it can be used either as an inside or an outside board, the change being effected by simply extending or narrowing to the proper width and changing the cheek-boards to opposite sides.

The shoveling-board may be thrown in any angle with the bottom of the wagon-bed by changing the location of the curved link or modifying its form or changing its length.

Figure 6:
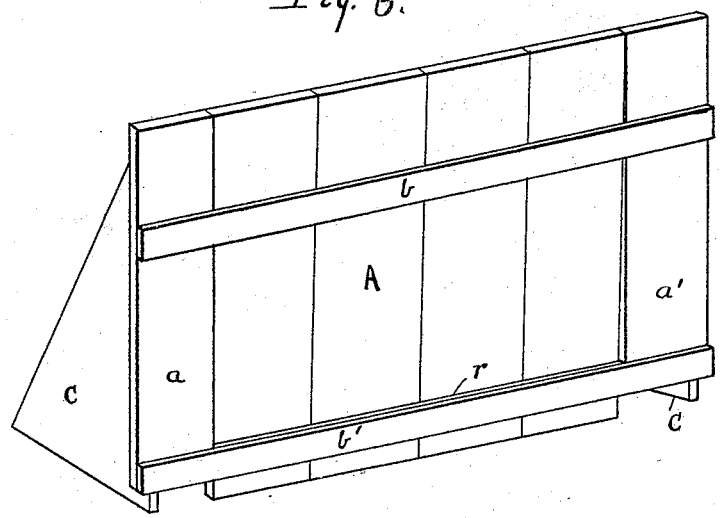
Figure 7:
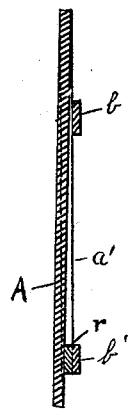

Fig. 6 is a perspective view showing the construction of my improved board. Fig. 7 is a cut section showing my improved construction.

In Fig. 6, A refers to the bottom of the board between the two outer or frame portions $a\ a'$. C C refer to the cheek-boards. $b\ b'$ are cross-pieces, and $r$ is a filler. It will be seen that by means of the filler $r$ that portion of the bottom of the board represented by A, which is between the outer or frame portions of $a\ a'$, is carried forward, so that when the board is in a raised position the portion of the bottom designated by A has at its lower portion a bearing upon the bottom of the wagon-bed. It will also be seen that, by means of the outside or frame portions $a\ a'$ being shorter than the other boards that form the bottom of the shoveling-board, when the board is lowered the portion A is prevented from being pushed from its bearing, which would follow were the frame portions $a\ a'$ of equal length with the portion A, by contacting with the edges of the wagon-box. The filler is of a corresponding thickness with the other boards of the bottom and carries the outer edge of the lower portions of the boards which form the part A forward just to the inner edge of the frame portion or boards $a\ a'$, thus providing a complete stop for the end of the wagon with no opening for the escape of grain. The cheek-boards are attached to the strips or frame-boards $a\ a'$.

I claim—

1. In combination with a shoveling-board, the curved bar D, bent forward so as to form the loops or pockets $D'\ D^2$, with the dog E, pivoted at H, with the extension I, and the bolt F, having the T-head G, and the extension F', all attached as described in specification.

2. In combination with a wagon-bed, a shoveling-board which may be used on the outside or the inside and to which is attached the curved bar or broken link D, with the loops or pockets $D'\ D^2$, suitably attached to the cheek-boards C, with the catch lever or dog E, pivoted as at H, with the bolt F, having the T-head G, and the projection F', all substantially as described and set forth.

3. In combination with a wagon-bed, a shoveling-board to be used on the inside of a wagon-bed, with the straps J and having the cheek-boards C, to which are attached the curved bar or broken link D, with the dog E, and the bolt F, substantially as described.

4. In combination with a wagon, a shoveling-board which may be used as an inside or an outside board and having cheek-boards to which are attached the curved bar or broken link D, which carries at its ends, respectively, the loops or pockets $D'\ D^2$, and to which is attached the dog E, all substantially as described and set forth.

5. In a shoveling-board, the combination of the back A, with the frame-boards $a\ a'$, with the cheek-boards C, the filler $r$, and the strips $b\ b'$, subtantially as described.

6. In a shoveling-board, the back A, which is carried forward at its lower portion by means of the filler $r$, with the strips $a\ a'$, and the cross-pieces $b\ b'$, substantially as described.

In testimony whereof I affix my signature in presence of two witnesses.

GEORGE G. GEIGER.

Witnesses:
JOHN D. SELTZER,
V. E. PAGE.